United States Patent [19]

Nakajima

[11] Patent Number: 4,681,470

[45] Date of Patent: Jul. 21, 1987

[54] BIDIRECTIONAL SERIAL PRINTER

[75] Inventor: Yoshinori Nakajima, Atsugi, Japan

[73] Assignee: Ricoh Company, Ltd., Tokyo, Japan

[21] Appl. No.: 567,037

[22] Filed: Dec. 30, 1983

[30] Foreign Application Priority Data

Jan. 11, 1983 [JP] Japan .................................. 58-1790

[51] Int. Cl.⁴ ............................................. B41J 19/30
[52] U.S. Cl. .................................... 400/323; 400/70; 400/279
[58] Field of Search .............. 400/70, 279, 323, 323.1, 400/121, 124

[56] References Cited

U.S. PATENT DOCUMENTS

| | | | |
|---|---|---|---|
| 3,708,050 | 1/1973 | McCarthy | 400/124 |
| 3,858,703 | 1/1975 | Duley | 400/124 |
| 3,970,183 | 7/1976 | Robinson | 400/124 |
| 4,279,199 | 7/1981 | Blanco | 400/124 X |

*Primary Examiner*—Paul T. Sewell
*Attorney, Agent, or Firm*—David G. Alexander

[57] ABSTRACT

A printer once stores input data in a buffer memory and then sequentially reads them out for printing. Whether the input data is predetermined one is determined and, based on the result, the sequence of input data stored in the buffer memory is changed. Even in an auto-back mode of operation, the printer prevents a host system associated therewith from erroneously detecting a printer error to stop a job thereof.

6 Claims, 14 Drawing Figures

| FIG. 9A |
| FIG. 9B |

BIDIRECTIONAL SERIAL PRINTER

BACKGROUND OF THE INVENTION

The present invention relates to a printer equipped with a buffer memory for the storage of input data which may be a serial impact printer, a thermal dot printer, an ink jet printer or a line printer.

Printers of the type mentioned above are generally used as output devices for computers, word processors, and the like. In such a printer, various input data exemplified by character data and space data to be printed out, and carriage return data supplied from a host system are stored sequentially in predetermined addresses of a buffer memory from the address "0" to the address "n" and, then, read sequentially therefrom to be printed out on a sheet. The input data are held in the buffer memory until carriage return data is supplied to the printer. Before the host system delivers carriage return data to the printer, the input data in the buffer memory are held therein and a busy signal is continuously fed out to the host system to reject reception of data from the host system in response to storage of carriage return data, until the address "0" (first address to store data) of the buffer memory become empty.

Therefore, where an auto-back print mode (printing in both directions) is employed to speed up the printout operation by saving the time required for carriage returns, the above-described type of printer causes the data input first to be output last so that intermediate addresses of the buffer memory may become empty during a printout operation but not the address "0". This is represented by Table 1 shown below.

TABLE 1

| ADDRESS | 0 | 1 | 2 | 3 | — | 250 | 251 | 252 |
|---|---|---|---|---|---|---|---|---|
| INPUT DATA | A | B | C | D | — | Z | CR | |
| INPUT SEQUENCE | 1 | 2 | 3 | 4 | — | 251 | 252 | |
| OUTPUT SEQUENCE IN BACK MODE | 251 | 250 | 249 | 248 | — | 1 | 252 | |
| OUTPUT SEQUENCE AMID BACK MODE | 3 | 2 | 1 | EMPTY | — | EMPTY | 4 | |

Thus, in the prior art type described, the busy signal is continuously fed out to the host system until all the data stored in the buffer memory are processed in the back-print mode. The slower the operation of the printer, the longer the duration of the busy signal is.

Meanwhile, a host system is generally constructed to determine that a printer associated therewith has failed and, thereby, interrupt the job, when the busy signal from the printer has lasted a predetermined period of time such as 2.5 seconds or 4 seconds. As a result, even when the printer sends out the busy signal to simply indicate that auto-back printing is under way, the host system identifies the situation as a failure in the printer to cut off the job.

SUMMARY OF THE INVENTION

It is therefore an object of the present invention to provide a printer which allows a printer to operate in the auto-back mode without being erroneously determined by its host system as failing.

It is another object of the present invention to provide a generally improved printer.

A printer of the present invention once stores input data in predetermined addresses of a buffer memory and then sequentially reads them out to print out on a sheet. The printer comprises a data discriminator circuit for determining whether the input data is predetermined data, and a data sequence changing means for changing a sequence of the input data stored in the buffer memory in response to a result of the determination by the data discriminator circuit.

The above and other objects, features and advantages of the present invention will become more apparent from the following detailed description taken with the accompanying drawing.

BRIEF DESCRIPTION OF THE DRAWING

FIG. 6 illustrates how FIGS. 6A and 6B are combined to constitute a block diagram of a control circuit for a printer to which the present invention is applied;

FIG. 9 illustrates how FIGS. 9A and 9B are combined to constitute a flowchart of data writing and data sequence changing controls which are implemented by a microcomputer.

DESCRIPTION OF THE PREFERRED EMBODIMENT

While the printer of the present invention is susceptible of numerous physical embodiments, depending upon the environment and requirements of use, a substantial number of the herein shown and described embodiment have been made, tested and used, and all have performed in an eminently satisfactory manner.

Figure 1:
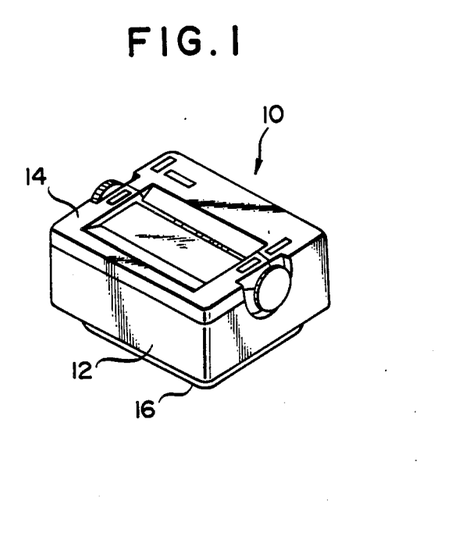
FIG. 1 is an external view of a printer to which the present invention is applicable.
Figure 2:
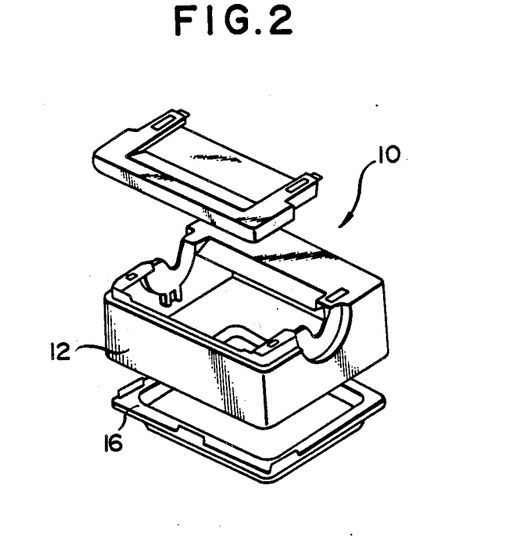
FIG. 2 is an exploded view of a housing assembly of the printer shown in FIG. 1.

Referring to FIG. 1 of the drawing, a serial impact printer to which the present invention is applicable is shown and generally designated by the reference numeral 10. A housing assembly of the printer 10 is shown in an exploded perspective view in FIG. 2. In these drawing, the printer housing assembly comprises a casing 12, a cover 14 and a bottom plate 16.

Figure 3:
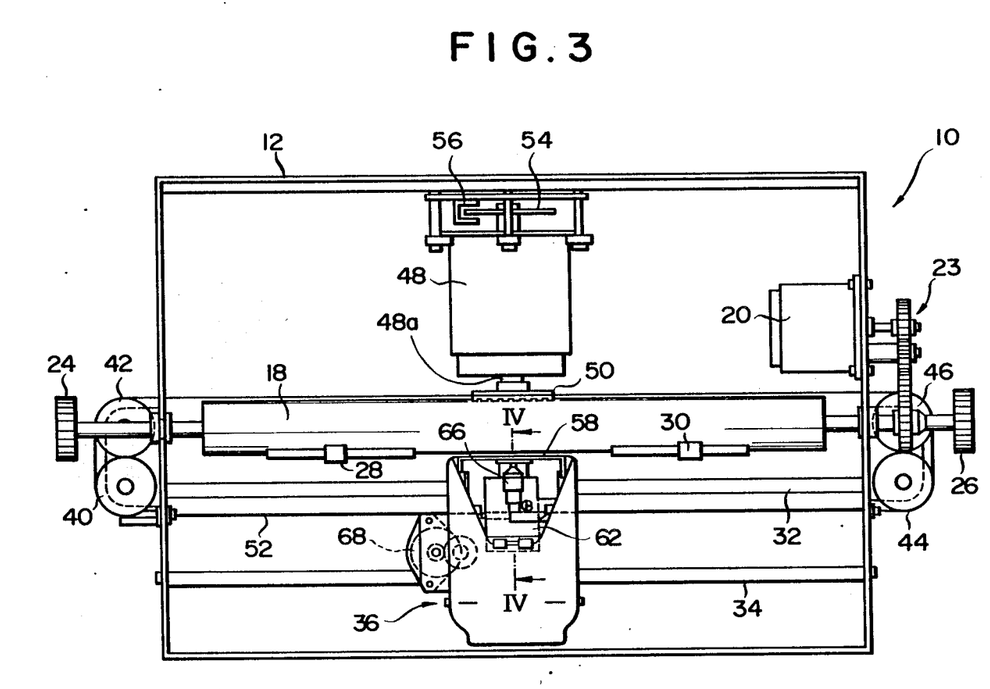
FIG. 3 is a plan view of a printing mechanism included in the printer of FIG. 1.
Figure 4:
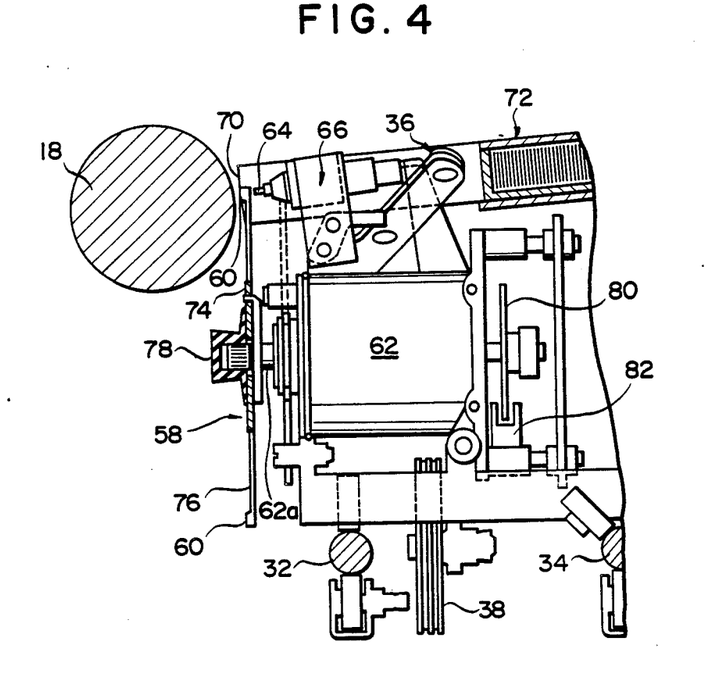
FIG. 4 is a section along line IV—IV of FIG. 3.

FIG. 3 is a plan view of a printing mechanism of the printer 10 and FIG. 4, an enlarged section along line IV—IV of FIG. 3. As shown, a platen 18 is rotatably mounted on the casing 12 in order to feed a sheet which is wound therearound. The platen 18 is driven by a sheet feed motor (line feed motor) 20 via a gear train 23 so as to automatically feed the sheet. Knobs 24 and 26 are rigidly mounted at opposite ends of the platen 18 and manually rotatable to load and unload a sheet. The sheet is pressed against the surface of the platen 18 by rotatable rollers 28 and 30.

A pair of parallel rods 32 and 34 are mounted on the casing 12. A carriage 36 is movable on and along the rods 32 and 34 parallel to the axis of the platen 18. The carriage 36 is driven by a drive motor (space motor) 48 mounted on the casing 12 by way of a pulley 38 (FIG. 4) located below the carriage 36, pulleys 40, 42, 44 and 46 located at both sides of the casing 12, a pulley 50 rigidly mounted on a leading end of a shaft 48a of the drive motor 48, and a wire 52 passed over the pulleys 38, 40, 42, 44, 46 and 50.

Rigidly carried by the rear end of the motor shaft 48a is a disc 54 which is formed with slots for sensing a position and a slot for sensing an origin. A space sensor 56 is provided which comprises a light emitting element and a light receiving element, i.e., a photosensor, which are located at both sides of the disc 54. The output of the space sensor 56 indicative of an amount of rotation is used for controlling the drive of the space motor 48, i.e., that of the carriage 36, as well as for sensing an operating state of the carriage 36.

As shown in detail in FIG. 4, the carriage 36 includes a drive motor (selection motor) 62 having a shaft 62a which carries at an end thereof a type wheel 58 having numerous types 60 thereon. Also included in the carriage 35 are a hammer assembly 66 made up of a hammer 64 for hammering selected one of the types 60 and a hammer magnet (not shown), and a ribbon carriage 72 interposed between the platen 18 and the type wheel 58 and driven by a drive motor (ribbon feed motor) 68 (FIG. 3) to feed an inked ribbon 70 in a given direction.

Figure 5:
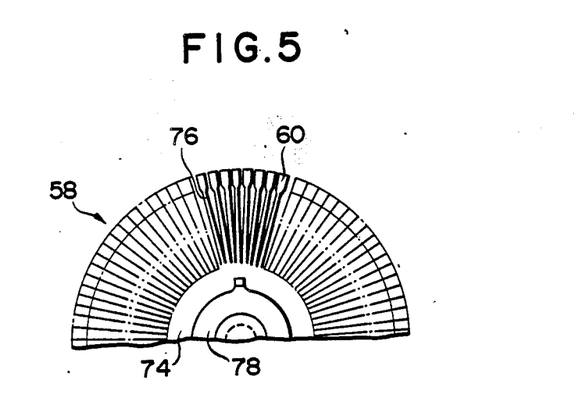
FIG. 5 is a plan view of an exemplary type wheel installed in the printing mechanism of FIG. 3.

As best shown in FIG. 5, the type wheel 58 includes a hub 74 from which a number of spokes 76 having a common configuration extend radially. The types 60 are carried by the spokes 76. A reinforcing ring 78 is rigidly connected to the hub 74 which is made of rubber or the like and engaged with the shaft 62a of the selection motor 62.

The shaft 62a carries at its rear end a disc 80 having position sensing slots and an origin sensing slot. A selection sensor 82, consisting of a photosensor, comprises a light emitting element and a light receiving element which face each other at opposite sides of the disc 80. The output of the selection sensor 82 is used for controlling the drive of the selection motor 62, that is, for selecting a specific type on the type wheel 58.

Figures 6, 6A:
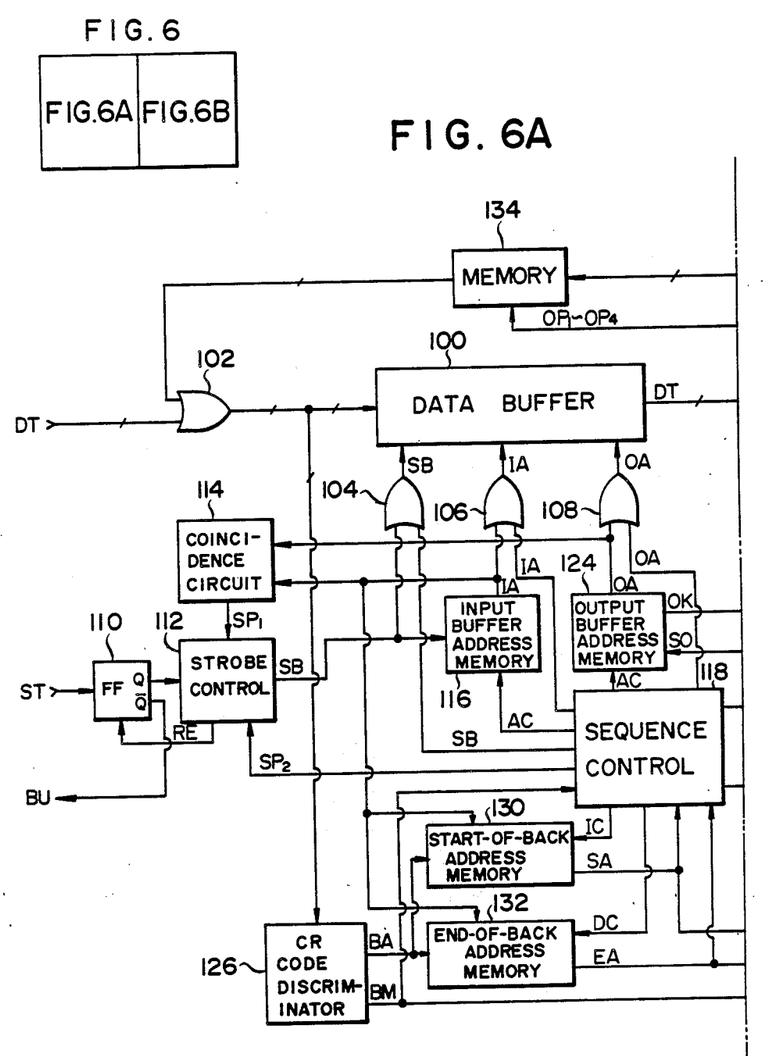
Figure 6B:
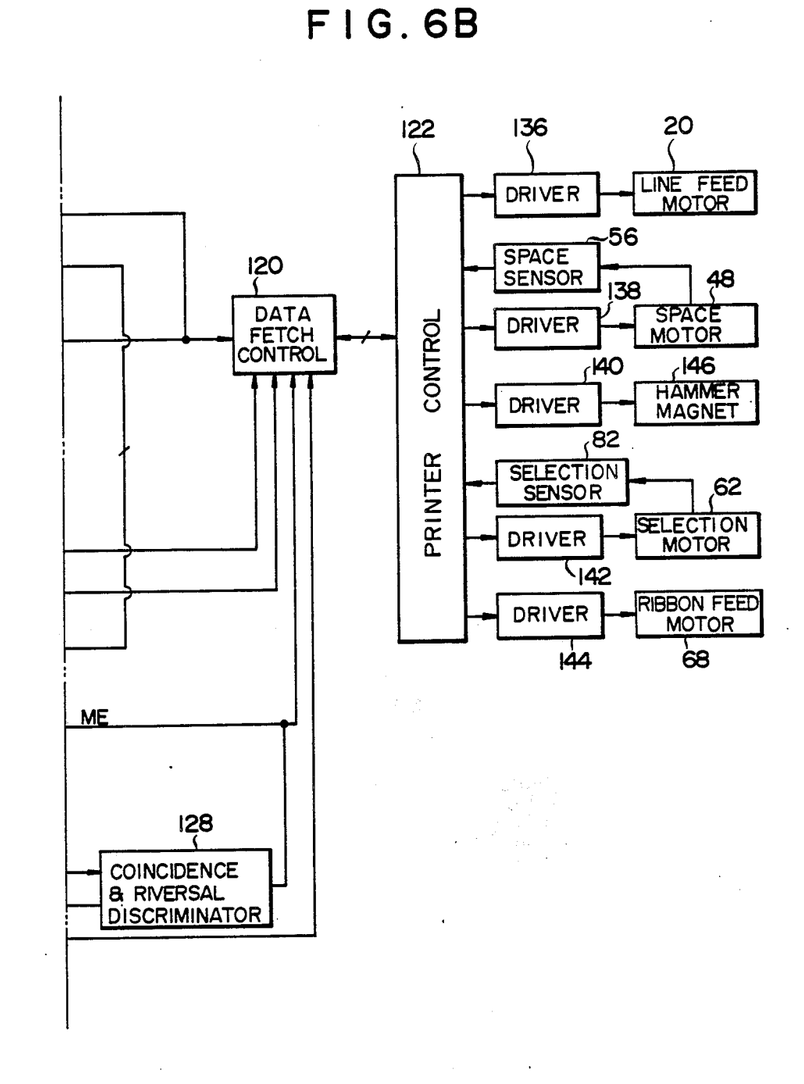

Referring to FIG. 6, a printer control circuit in accordance with the present invention is shown in a block diagram. The circuit includes a data buffer 100 which is a buffer memory. The data buffer 100 is supplied through a gate 102 with various data DT such as character data to be printed out, space data and carriage return data instructing a return (back) of the carriage 36 (FIG. 1), all of which may be output from a computer, a word processor or like host system. When a strobe signal SB arrives through a gate 104 (SB=1), the data buffer 100 writes data DT in an input address IA from a gate 106; when the strobe SB is absent (SB=0), the data buffer 100 reads out data DT from an output address OA from a gate 108.

A flip-flop (FF) 110 is provided which turns its Q output to (logical) "1" and $\overline{Q}$ output to "0" when supplied with a strobe ST, while turning the Q output to "0" and the $\overline{Q}$ output to "1" in response to a reset signal RE output from a strobe control circuit 112. The $\overline{Q}$ output of the FF 110 is fed out to the host system as a busy signal BU. While the busy signal BU is "0", the host system does not deliver the strobe signal ST.

When the Q output of the FF 110 has become "1", the strobe control 112 supplies a strobe SB to the data buffer 100 via the gate 104 and an input buffer address memory 116 if it is not supplied with an inhibit signal $SP_1$ from a coincidence circuit 114, which will be described. After data has been written, the strobe control 112 delivers a reset signal RE to the FF 110. If the strobe control 112 is supplied with an inhibit signal $SP_2$ from a sequence control circuit 118, which will also be described, it does not feed out the reset signal RE.

Concerning the input buffer address memory 116, in response to a strobe SB from the strobe control 112, it delivers the input address IA to the data buffer 100 via the gate 106 if an inhibit signal AC from the sequence control 118 is absent, whereafter its input address IA is incremented (+1).

The reference numeral 120 designates a data fetch control circuit. When an end-of-control signal is routed from a printer control circuit 122, which will be described, to the data fetch control 120, the latter delivers a read signal SO to an output buffer address memory 124 while transferring data DT output from the data buffer 100 to the printer control 122. Confirming a complete signal OK from the output buffer address memory 124, the data fetch control 120 delivers an increment signal to the output buffer address memory 124. The data fetch control 120 stops the above-described data fetch control from the instant when it is supplied with a back mode signal BM from a CR code discriminator circuit 126 over to the instant when it is supplied with a mode end signal ME from a coincidence and reversal discriminator circuit 128. When the output buffer address memory 124 has not been supplied with the inhibit signal AC from the sequence control 118 at the instant of arrival of the read signal SO from the data fetch control 120, it feeds out an output address OA to the data buffer 100 via the gate 108 and the complete signal OK to the data fetch control 120, thereafter being caused to increment its output address OA (+1). Here, both the input buffer address memory 116 and the output buffer address memory 124 are end-round memories (value next to the largest is zero); their largest value is equal to the number of addresses for data storage of the data buffer 100.

When the input address IA from the input buffer address memory 116 and the output address OA from the output buffer address memory 124 are coincident with each other, the coincidence circuit 114 supplies the strobe control 112 with an inhibit signal $SP_1$ for preventing it from producing a strobe SP or a reset signal RE.

The CR code discriminator 126 constitutes data discrimination means which decides whether the input data DT is carriage return data, which is the predetermined data. When it has not delivered a back signal BA at the instant of arrival of carriage return data, the CR code discriminator 126 delivers a back signal BA; when it has delivered a back signal BA at that instant, the discriminator 126 stops producing it and, delivers a back mode signal BM instead.

Designated by the reference numeral 132 is an end-of-back address memory 132. As soon as the back signal BA from the CR code discriminator 126 disappears, that is, at the trailing edge of the back signal BA if it is a high or "H" level signal, the end-of-back address memory 132 is loaded with a value produced by decrementing ($-1$) an input address IA from the input buffer address memory 116.

In response to a back mode signal BM output from the CR code discriminator 126, the sequence control 118 supplies the strobe control 112 with an inhibit signal $SP_2$ for inhibiting the delivery of a reset signal RE, and the input buffer address memory 116 and output buffer address memory 124 with an inhibit signal AC for inhibiting the delivery of the input address IA and output address OA respectively. Also, to execute a control for rearranging data stored in the data buffer 100, the sequence control 118 reads a start address SA from a start-of-back address memory 130 and produces an increment signal IC for incrementing the start address SA, reads an end address EA from the end-of-back address memory 132 and produces a decrement signal DC for decrementing the end address EA, applies a strobe SB, input address IA and output address OA to the data buffer 100, and applies read and write control signals $OP_1$-$OP_4$ to a memory 134 which is adapted to route data DT supplied from the data buffer 100 back to the data buffer 100 via a gate 102. Details of this operation will be discussed later. The sequence control 118 will terminate the delivery of the inhibit signals $SP_2$ and AC and the rearrangement control in response to a mode end signal ME from the coincidence and reversal discriminator 128.

The discriminator 128 produces a mode end signal ME when the start address SA from the start-of-back address memory 130 and the end address EA from the end-of-back address memory 132 are coincident (SA=EA) or their relation is inverted (SA>EA). The start-of-back address memory 130, end-of-back address memory 132, sequence control 118, memory 134 and coincidence and reversal discriminator 128 constitute in combination, data sequence changing means adapted to rearrange data stored in the data buffer 100, which is a buffer memory.

As well known in the art, the printer control 122 comprises a microcomputer or the like. In response to data DT supplied via the data fetch control 120, the printer control 122 performs various controls by selectively driving the line feed motor 20, space motor 48, hammer magnet 146 associated with the hammer 64, mem-selection motor 62 and ribbon feed motor 68 by way of their associated drives 136, 138, 140, 142 and 144. After fully processing the input data DT, the printer control 122 feeds out an end-of-processing signal to the data fetch control 120.

The operation of the printer having the above construction will be described with reference also made to FIGS. 7-9.

Figure 7:
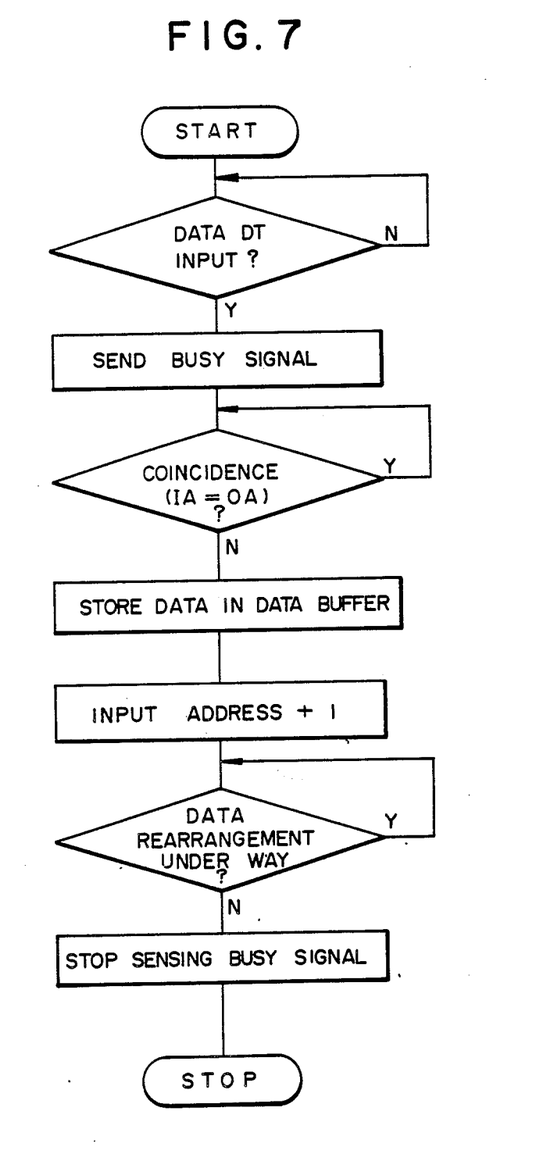
FIG. 7 is a flowchart demonstrating a control for writing data in a data buffer of FIG. 6.

FIG. 7 is a flowchart demonstrating a control for writing data in the data buffer 100. In the flowchart, when the printer is supplied with input data DT together with a strobe ST from the host system, the FF 110 is set by the strobe ST turning the Q output to "1" and delivering a busy signal BU (BU=0), which is the Q output. This inhibits delivery of the next data DT from the host system. Then, if the inhibit signal $SP_1$ from the coincidence circuit 114 is absent, that is, the data buffer 100 has empty addresses, the strobe control 112 produces a strobe SP so that the input data DT is stored in an input address IS from the input buffer address memory 116 in the data buffer 100. Thereafter, the strobe control 112 stops the delivery of the strobe SB and increments (+1) the input address IA of the input buffer address memory 116. Further, if the strobe control 112 is not supplied with the inhibit signal $SP_2$ from the sequence control 118, that is, if data rearrangement is not performed, the strobe control 112 applies a reset signal RE to the FF 110 to interrupt the delivery of the busy signal BU (BU=1). Under this condition, the strobe control 112 awaits the arrival of the next data DT. In this manner, data DT are sequentially stored in predetermined addresses of the data buffer 100.

Figure 8:
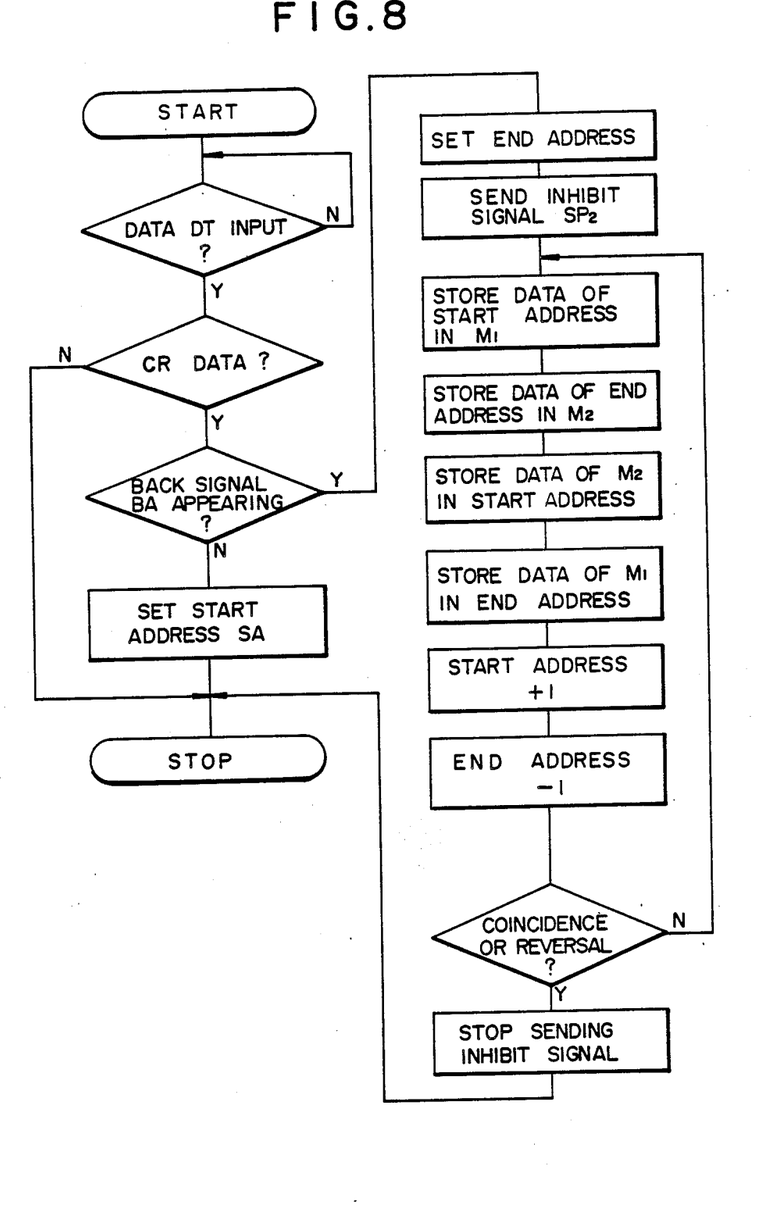
FIG. 8 is a flowchart demonstrating a control for changing the sequence of data stored in the data buffer.

FIG. 8 shows a flowchart demonstrating the control for the rearrangement of data stored in the data buffer 100. In FIG. 8, on entry of data DT, the CR code discriminator 126 checks whether the input data is the carriage return data (hereinafter referred to as "CR data"). If so, the discriminator 126 determines whether it is producing the back signal BA and, if not, produces it. This sets in the start-of-back address memory 130 an input address IA one address after the input address IA of the CR data as a start address SA. Meanwhile, if producing the back signal BA, the CR code discriminator 126 stops producing it, sets in the end-of-back address memory 132 an input address IA one address before the input address IA of the CR data as an end address EA, and delivers a back mode signal BM.

In response to the above procedure, the sequence control 118 delivers an inhibit signal $SP_2$ to the strobe control 112 in order to inhibit the removal of the busy state after CR data writing, continuing the delivery of the busy signal BU. At the same time, the sequence control 118 supplies the input buffer address memory 116 and the output buffer address memory 124 with an inhibit signal AC thereby inhibiting the delivery of their input address IA and output address OA.

Then, the sequence control 118 reads the start address SA out of the start-of-back address memory 130, feeds out the start address SA to the data buffer 100 as an output address OA, so as to read data DT in the start address. Then, the sequence control 118 applies a control signal $OP_1$ to the memory 134 to store the data DT in the start address SA in an address $M_1$ of the memory 134. Further, the sequence control 118 reads the end address EA of the end-of-back address memory 132, delivers the end address EA to the data buffer 100 as an output address OA to read data DT in the end address EA, and then delivers a control signal $OP_2$ to the memory 134 to store the data DT in the end address EA in an address $M_2$ of the memory 134.

Next, the sequence control 118 supplies a control signal $OP_3$ to the memory 134 to read data DT in the address $M_2$, applies a strobe SB and the start address SA as an input address IA to the data buffer 100, and thereby store data DT in the address $M_2$ in the start address SA of the data buffer 100. Also, the sequence control 118 applies a control signal $OP_4$ to the memory 134 to read data DT out of the address $M_1$, delivers a strobe SB and the end address EA as an input address IA to the data buffer 100, and thereby stores data DT in the end address EA of the data buffer 100. In the manner described, the data in the start address SA and the data in the end address EA in the data buffer 100 are replaced with each other.

Figures 9, 9A:
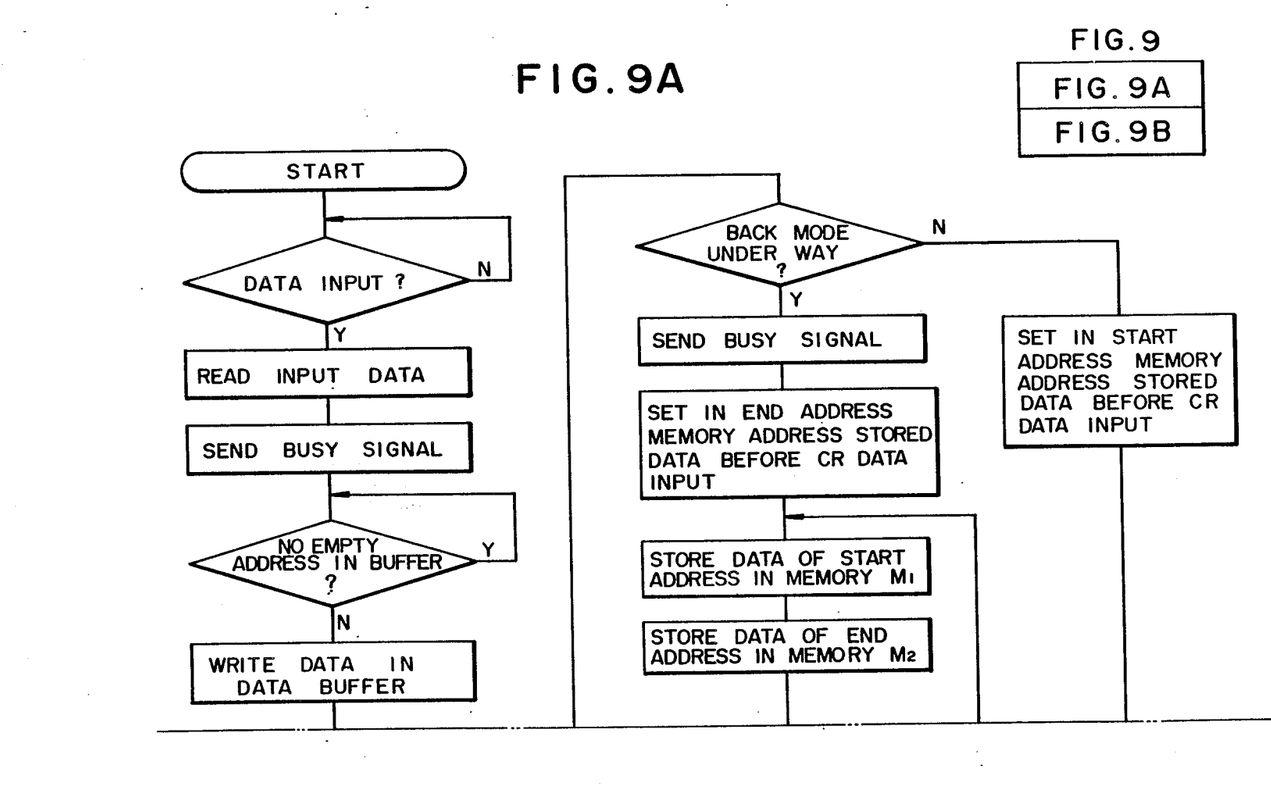
Figure 9B:
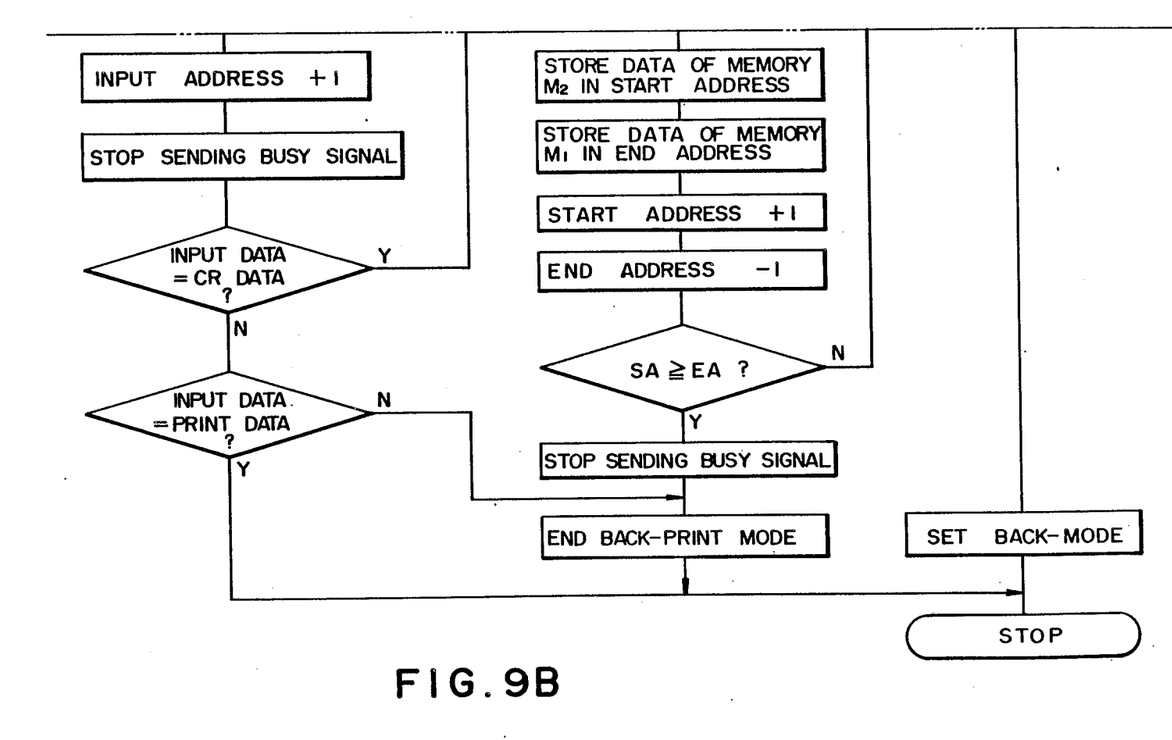

After the rearrangement of the pair of data, the sequence control 118 supplies the start-of-back address memory 130 with an increment signal IC to increment (+1) the start address SA, while supplying the end-of-back address memory 132 with a decrement signal DC to decrement (−1) the end address EA. If in this instance the mode end signal ME from the coincidence and reversal discriminator 128 is absent, the sequence control 118 repeats the procedure described, that is, interchanging data DT in the start address SA and the end address EA in the data buffer 100, incrementing (+1) the start address SA, decrementing (−1) the end address EA, and thereby changing the sequence of the data DT in the data buffer 100. As the discriminator 128 produces a mode end signal ME due to coincidence or reversal of the start address SA and the end address EA, the sequence control 118 stops producing the inhibit signal $SP_2$ to enable the strobe control 112 to produce a reset signal RE and, thereby, cancel the busy state. At the same time, the sequence control 118 stops the delivery of the inhibit signal AC, thus terminating the data rearrangement control. By the operation described above, the order of data DT stored in the data buffer 100 is reversed during the back print mode.

Where the circuitry shown in FIG. 6 adapted to control the data buffer 100 is implemented by a microcomputer, the data writing and data sequence changing controls may be perfomed as represented by the flowchart of FIG. 9.

Figure 10:
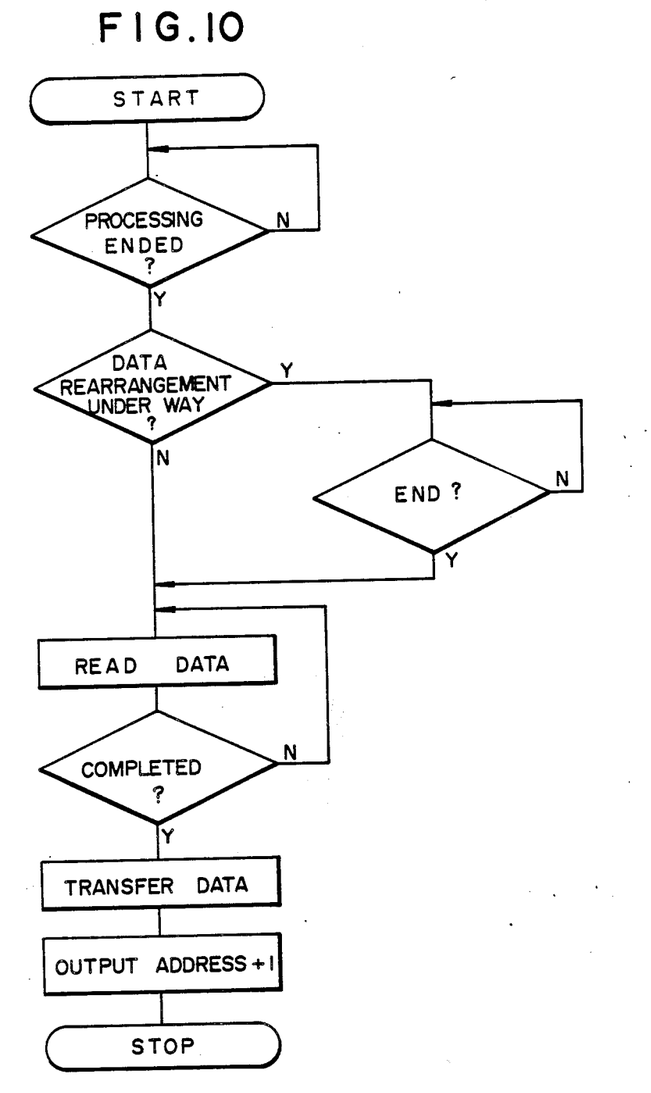
FIG. 10 is a flowchart demonstrating a control for reading data out of the data buffer.

FIG. 10 is a flowchart showing a data read control for reading data out of the data buffer 100. When an end-of-processing signal is transferred from the print control 122 to the data fetch control 120, the latter determines whether the data rearrangement is under way, by checking a flag which is set on the arrival of a back mode signal BM from the CR code discriminator 126. If no, the control 120 delivers a read signal SO to the output buffer address memory 124; if yes, the delivery of the read signal SO occurs after awaiting the supply of a mode end signal ME. Then, the control 120 checks the complete signal OK to see if the data DT stored in the output address OS of the data buffer 100 has been fully read out. If yes, the control 120 transfers the data DT output from the buffer 100 to the printer control 122, increments (+1) the output address OA of the output buffer address memory 124, and then awaits the arrival of the next end-of-processing signal.

The various controls executed as described above will be discussed concretely with reference to Table 2 as well. Assume that the data buffer 100 has addresses "0" to "252".

quentially input in the indicated order so that print data (character data or space data) are stored in the addresses "0" to "250". CR data appearing as the 252nd data is stored in the address "251". Then, the delivery of the back signal BA from the CR code discriminator 126 is interrupted whereby the address "250" is set in the start-of-back address memory 132 as an end address EA.

This is followed by the data sequence changing control performed by the sequence control 118. As shown in Table 2, data "A" in the start address SA (SA=0) and the data "Z" in the end address EA (EA=250) are interchanged, the start address SA is incremented and the end address EA is decremented, and then, in the same manner, the data "B" and "Y" are interchanged. Such a procedure is repeated to reverse the order of the input data DT in the addresses "0" to "250". As a result, the data are output starting from the address "0" in the back print mode. That is, because the addresses become empty sequentially from the address "0", the data may be stored sequentially in the addresses starting from the address "0".

The time period necessary for the data rearrangement in the data buffer 100 is quite short, e.g. shorter than about 2 milliseconds in the case where a microcomputer is used. This results in a short duration of the busy signal which prevents the host system from accidentally determining that the printer has failed during a back print mode.

In summary, it will be seen that the present invention provides a printer which is capable of performing fast auto-back printing while eliminating the possibility of a host system associated therewith erroneously detecting printer errors.

Various modifications will become possible for those skilled in the art after receiving the teachings of the present disclosure without departing from the scope thereof.

What is claimed is:

1. A printer in which input data are once stored in predetermined addresses of a buffer memory and then sequentially read therefrom to be printed out on a sheet, comprising:
  data discriminator means for determining whether the input data is predetermined data; and
  data sequence changing means for changing a sequence of the input data stored in the buffer memory such that an order of the input data is reversed in response to a result of the determination by said data discriminator means;
  the carriage return code discriminator circuit being constructed to reproduce a back signal if not pro-

TABLE 2

| ADDRESS | 0 | 1 | 2 | — | 248 | 249 | 250 | 251 | 252 |
|---|---|---|---|---|---|---|---|---|---|
| INPUT DATA | A | B | C | — | X | Y | X | CR | |
| INPUT SEQUENCE | 1 | 2 | 3 | — | 249 | 250 | 251 | 252 | |
| REARRANGED DATA SEQUENCE | Z | Y | X | — | C | B | A | CR | |
| OUTPUT SEQUENCE IN BACK MODE | 1 | 2 | 3 | — | 249 | 250 | 251 | 252 | |
| OUTPUT SEQUENCE AMID BACK MODE | EMPTY | EMPTY | 1 | — | 247 | 248 | 249 | 250 | |

Assume that CR data has been stored in the address "252" last time to cause the CR code discriminator 126 to deliver a back signal BA, and an address "0" has been set in the start-of-back address memory 130 as a start address SA. Then, data DT shown in Table 2 are seducing the back signal when the input data is the carriage return data and, if producing, stop delivery of the back signal and deliver a back mode signal.

2. A printer as claimed in claim 1, in which the data sequence changing means comprises a start-of-back address memory which, when supplied with the back signal from the carriage return code discriminator circuit, generates a start address which is produced by incrementing an input address input to the buffer memory by one.

3. A printer as claimed in claim 2, further comprising an end-of-back address memory which, when the back signal supplied from the carriage return code discriminator circuit disappears, generates an end address which is produced by decrementing the input address input to the buffer memory by one.

4. A printer as claimed in claim 3, in which the data sequence changing means further comprises a sequence control circuit which reads the start address from the start-of-back address memory and produces an increment signal for incrementing the start address, reads the end address from the end-of-back address memory and produces a decrement signal for decrementing the end address, and produces a strobe signal, an input address and an output address which are supplied to the buffer memory.

5. A printer as claimed in claim 4, in which the data sequence changing means further comprises a memory which is supplied with data output from the buffer memory and supplies said data to the buffer memory, the sequence control circuit being constructed to produce control signals for writing data and reading data from said memory.

6. A printer as claimed in claim 5, in which the data sequence changing means further comprises a coincidence and reversal discriminator circuit for producing a mode end signal when the start address output from the start-of-back address memory and the end address output from the end-of-back address memory coincide with each other and when the start address becomes larger than the end address.

* * * * *